(12) United States Patent
Yoon et al.

(10) Patent No.: US 7,769,125 B2
(45) Date of Patent: Aug. 3, 2010

(54) SPACER GRID FOR NUCLEAR REACTOR FUEL ASSEMBLIES

(75) Inventors: Kyung-Ho Yoon, Daejeon (KR);
Heung-Seok Kang, Daejeon (KR);
Hyung-Kyu Kim, Daejeon (KR);
Kee-Nam Song, Daejeon (KR);
Yeon-Ho Jung, Daejeon (KR);
Tae-Hyun Chun, Daejeon (KR);
Dong-Seok Oh, Daejeon (KR);
Wang-Kee In, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 10/773,733

(22) Filed: Feb. 5, 2004

(65) Prior Publication Data

US 2005/0105677 A1        May 19, 2005

(30) Foreign Application Priority Data

Oct. 7, 2003        (KR) ..................... 10-2003-0069672

(51) Int. Cl.
*G21C 3/356*        (2006.01)
(52) U.S. Cl. ..................... 376/442; 376/438; 376/441
(58) Field of Classification Search ................. 376/441, 376/442, 439
See application file for complete search history.

(56) References Cited

U.S. PATENT DOCUMENTS 3,966,550 A * 6/1976 Foulds et al. ................. 376/442

(Continued)

FOREIGN PATENT DOCUMENTS

WO        WO 94/25965        11/1994

(Continued)

OTHER PUBLICATIONS

Rahn et al., "A Guide to Nuclear Power Technology", Krieger Publishing Co., Malabar, FL (USA) (1992), espcially p. 230.*

(Continued)

*Primary Examiner*—Johannes P Mondt
(74) *Attorney, Agent, or Firm*—Bachman & LaPointe, P.C.

(57) ABSTRACT

A spacer grid used for placing and supporting fuel rods in nuclear reactor fuel assemblies is disclosed. The spacer grid of this invention has a plurality of inner strips intersecting each other to form a plurality of guide tube cells and a plurality of fuel rod cells, with a plurality of mixing blades projecting upward from the inner strips at intersections of the inner strips. The spacer grid further includes a plurality of perimeter strips to encircle the intersecting inner strips. Each of the perimeter strips is fabricated with a plurality of unit intermediate strips and a plurality of unit corner strips, with a grid spring provided on each of the unit strips. The grid spring includes a vertical opening formed at a central area of each of the unit strips, a vertical support part extending vertically between the central portions of top and bottom edges of the vertical opening, and a fuel rod support part provided at a central portion of the vertical support part while being bent to have an outward rounded cross-section. The vertical support part is bent at two steps, and the fuel rod support part is bent to be in equiangular contact with each of the fuel rods, thus accomplishing a uniform contact pressure distribution when the fuel rod support part is in contact with each of the fuel rods.

7 Claims, 14 Drawing Sheets

U.S. PATENT DOCUMENTS

| | | | | |
|---|---|---|---|---|
| 4,224,107 A | * | 9/1980 | Delafosse et al. | 376/442 |
| 4,396,573 A | | 8/1983 | Feutrel | |
| 4,659,542 A | | 4/1987 | Kerrey | |
| 4,666,663 A | * | 5/1987 | Steinke | 376/441 |
| 4,683,115 A | * | 7/1987 | Fromel et al. | 376/442 |
| 4,705,663 A | * | 11/1987 | Steven et al. | 376/441 |
| 4,879,090 A | * | 11/1989 | Perrotti et al. | 376/442 |
| 4,885,127 A | * | 12/1989 | Yokoyama | 376/462 |
| 4,897,241 A | * | 1/1990 | Anthony | 376/438 |
| 5,139,736 A | * | 8/1992 | Bryan | 376/442 |
| 5,303,272 A | * | 4/1994 | Oyama et al. | 376/261 |
| 5,303,276 A | * | 4/1994 | DeMario et al. | 376/442 |
| 5,434,898 A | * | 7/1995 | Barkhurst | 376/438 |
| 5,666,389 A | * | 9/1997 | Andersson et al. | 376/442 |
| 6,167,105 A | * | 12/2000 | Yoon et al. | 376/442 |
| 6,236,702 B1 | * | 5/2001 | Chun et al. | 376/462 |
| 6,393,087 B1 | * | 5/2002 | Oh et al. | 376/439 |
| 6,526,116 B1 | * | 2/2003 | Nguyen et al. | 376/442 |
| 6,542,567 B1 | * | 4/2003 | Mayet et al. | 376/442 |
| 6,707,872 B2 | | 3/2004 | Yoon et al. | |
| 2003/0012329 A1 | * | 1/2003 | Yoon et al. | 376/442 |

FOREIGN PATENT DOCUMENTS

| | | |
|---|---|---|
| WO | WO 99/03108 | 1/1999 |

OTHER PUBLICATIONS

"Spring constant", according to Academic Press Dictionary of Science and Technology, Elsevier Science and Technology, Oxford 1992, 1996; retrieved through http://www.credoreference.com.*

"Force constant", according to Academic Press Dictionary of Science and Technology, Elsevier Science and Technology, Oxford 1992, 1996; retrieved through http://www.credoreference.com.*

Merriam-Webster's Colleigate Dictionary, tenth Edition, ISBN 0-87779-708-0 (1999), p. 1123, Merriam-Webster, Inc., Springfield, MA (USA).*

Kee-nam Song et al.: "Shape optimization of Spacer Grid Springs to Support Nuclear Fuel Rods", 11th International Conference on Nuclear Engineering Tokyo, Japan, Apr. 20-23, 2003 ICONE11-36500.

Ki-Jong Park et al.; "Design of a Spacer Grid Using Axiomatic Design"; Journal of Nuclear Science and Technology; Dec. 2003; p. 1-9; vol. 40, No. 12; Atomic Energy Society of Japan; Tokyo, Japan.

Kee-Nam-Song et al.: "Shape optimization of Spacer Grid Springs to Support Nuclear Fuel Rods", 11th International Conference on Nuclear Engineering Tokyo, Japan, Apr. 20-23, 2003 ICONE11-36500.

Ki-Jong Park et al.; "Structural Optimization for Non-Linear Behavior Using Equivalent Static Loads by Proportional Transformation of Loads"; Journal of Mechanical Science and Technology; Jul. 29, 2005, Nov. 25, 2005; p. 24-75; vol. A, 30, No. 1; The Korean Society of Mechanical Engineers; Seoul, Korea.

* cited by examiner

SPACER GRID FOR NUCLEAR REACTOR FUEL ASSEMBLIES

BACKGROUND OF THE INVENTION

1. Field of the Invention

The present invention relates, in general, to spacer grids used in nuclear reactor fuel assemblies to place and support a plurality of longitudinal fuel rods in the reactor fuel assemblies and, more particularly, to a spacer grid for pressurized water reactor fuel assemblies, which has a grid spring at a central portion of each unit strip of perimeter strips so that the grid springs of the perimeter strips are in equiangular surface contact with the fuel rods in a pressurized water reactor fuel assembly, thus reducing fretting corrosion of the fuel rods, and which has both guide vanes and guide taps on upper edges of some unit strips of the perimeter strips that are required to guide cross flows of the coolant in the reactor fuel assembly, thus maintaining desired intensity of cross flows of the coolant in the reactor fuel assembly and improving the thermal redundancy of the spacer grid.

2. Description of the Related Art

Spacer grids are elements of a nuclear reactor fuel assembly, and each have a plurality of grid springs and dimples in their support cells so as to place and support a plurality of longitudinal fuel rods within the cells of the reactor fuel assembly. As shown in FIG. 1, a typical nuclear reactor fuel assembly 101 is fabricated with a plurality of guide tubes 113 and a plurality of spacer grids 110. The plurality of guide tubes 113 are vertically arranged between a top support pallet 111 and a bottom support pallet of the reactor fuel assembly 101, while the plurality of spacer grids 110 to place and support a plurality of longitudinal fuel rods 125 in the fuel assembly 101 are horizontally arranged along the guide tubes 113 at regular intervals in a longitudinal direction of the fuel assembly 101. The spacer grids 110 are typically mounted to the guide tubes 113 through a welding process.

Each of the spacer grids 110 includes a plurality of inner strips 115 and four perimeter strips 116. The plurality of inner strips 115 are arranged while intersecting each other at right angles to form an egg-crate pattern, prior to being encircled with the four perimeter strips 116. The inner and perimeter strips 115 and 116 are made of a zircaloy alloy, and respectively have a plurality of grid springs 150 and 120 to place and support the plurality of fuel rods 125 in the fuel assembly, as shown in FIGS. 2A and 2B. However, the inner and perimeter strips 115 and 116 do not have any guide vane specifically designed to guide cross flows of the coolant in the fuel assembly or any guide tap specifically designed to prevent interference of the strips 115 and 116 with the fuel rods 125.

When the grid springs 150 and 120 of the inner and perimeter strips 115 and 116, and a plurality of dimples 170 of the inner strips 115 have deficient spring forces, the spacer grids 110 may fail to stably place or support the fuel rods 125 at desired positions in the fuel assembly, thus reducing the soundness of the fuel assembly. On the contrary, when the grid springs 120 and 150 and the dimples 170 are too strong in their spring forces, excessive friction may be generated between the fuel rods 125 and the spacer grids 110 during an insertion of the fuel rods 125 into the cells of the spacer grids 110. Such excessive friction may cause damage, such as scratches, to the external surfaces of the fuel rods 125, and fail to appropriately support the fuel rods 125 in the case of lengthwise growth of the fuel rods 125 caused by neutron radiation during an operation of a nuclear reactor. In such a case, the fuel rods 125 may be undesirably bent. When the fuel rods 125 are bent as described above, the fuel rods 125 in the reactor fuel assembly become closer to each other to be sometimes brought into undesired contact with each other, so that coolant channels defined between the fuel rods 125 in the fuel assembly may become narrower or even closed. In the above state, heat cannot be efficiently transferred from the fuel rods 125 to the coolant, thus parts of the fuel rods 125 may be overheated, and sometimes cause a DNB (Departure caused by Nucleate Boiling) to reduce the output power of nuclear fuel.

The recent trend of development in the reactor fuel assemblies aims at the provision of highly combustible and defect-free nuclear fuel. Particularly, to provide the highly combustible nuclear fuel, the heat transfer efficiency between the fuel rods and the coolant in the reactor fuel assembly must be enhanced. This means that the heat transfer from the fuel rods to the coolant in the reactor fuel assemblies must be improved to enhance the thermal efficiency of the reactor fuel assemblies. The improvement in the heat transfer from the fuel rods to the coolant may be accomplished by designing the reactor fuel assembly to allow the coolant to optimally flow around the fuel rods in the reactor fuel assembly. In an effort to accomplish the optimal flows of the coolant within the reactor fuel assembly, several types of spacer grids having new structures have been proposed. For example, to provide the optimal flows of the coolant in the reactor fuel assembly, a plurality of mixing blades 227 may be attached along an upper edge of each inner strip 215 of a spacer grid at intersections of the inner strips 215, as shown in FIGS. 3A and 3B, so as to mix the coolant and generate cross flows of the coolant between neighboring coolant channels in the fuel assembly. To mix the coolant and generate the cross flows of the coolant between the neighboring coolant channels, the mixing blades 227 are curved in opposite directions, and the size and angles of the mixing blades 227 are optimally determined. The mixing blades 227 provided on the spacer grid thus maintain a desired coolant flow pattern relative to neighboring spacer grids.

However, the above-mentioned conventional technique for accomplishing the optimal flows of the coolant in the fuel assemblies by use of the mixing blades 227 and thereby enhancing the thermal efficiency of the fuel assemblies is based on the formation of more active turbulent flows of the coolant around the fuel rods of the fuel assemblies. Therefore, the conventional technique undesirably induces vibration of the fuel rods in the fuel assemblies due to the active turbulent flows of the coolant. Such vibration of the fuel rods in the reactor fuel assemblies is a so-called "flow-induced vibration". Due to the flow-induced vibration of the fuel rods in the reactor fuel assemblies, the fuel rods slide or move relative to the grid springs and dimples at contact surfaces thereof. The fuel rods are thus abraded on the contact surfaces due to friction. The flow-induced vibration of the fuel rods thus finally causes "fretting corrosion of the fuel rods". The conventional technique for enhancing the thermal efficiency of the reactor fuel assemblies and providing highly combustible nuclear fuel may undesirably cause damage to the fuel rods.

While designing the spacer grids for reactor fuel assemblies, it is necessary to accomplish the following three requirements: 1) the spacer grids must stably support the fuel rods until the expected life span of the fuel rods expires; 2) the spacer grids must be free from causing fretting corrosion of the fuel rods; and 3) the spacer grids must have outermost cells having higher structural durability.

In a detailed description, first, to allow the spacer grids to stably support the fuel rods within a reactor fuel assembly until the expected life span of the fuel rods expires, and accomplish the soundness of the fuel assembly, the spacer grids must be designed such that the spacer grids effectively support the fuel rods with sufficient spring force of the grid springs and dimples thereof. In addition, the elastic range of the grid springs and dimples must be enlarged, thereby maintaining a desired spring force regardless of variable fuel rod support conditions inside the reactor fuel assembly until the expected life span of the fuel rods expires. However, the grid springs and dimples of a conventional spacer grid for the reactor fuel assemblies gradually lose the original spring forces thereof, due to a neutron radiation during an operation of a nuclear reactor. Therefore, the grid springs and dimples may fail to desirably support the fuel rods, thus there may be formed gaps between the fuel rods and both the grid springs and the dimples. Due to the gaps, the spacer grids do not stably support the fuel rods, but undesirably allow the fuel rods to be excessively loaded and move in every direction by the flows of the coolant. The spacer grids thus reduce the soundness of the reactor fuel assemblies.

Second, the protection of the fuel rods from the fretting corrosion in the reactor fuel assembly may be accomplished by removing the causes of the fretting corrosion. The causes of the fretting corrosion of the fuel rods in the reactor fuel assembly include gaps formed between the grid springs, the dimples and the fuel rods. The gaps may be formed by a reduction in the spring force of the grid springs and dimples due to the neutron radiation during the operation of the nuclear reactor, a difference in the thermal expansion between the fuel rods and the spacer grids, and a reduction in the diameter of the fuel rods caused by an elongation of the fuel rods. When the gaps are formed between the grid springs, the dimples and the fuel rods, the fuel rods are repeatedly brought into contact with and spaced away from the grid springs and the dimples, due to axial and transversal flows of the coolant, thus causing the fretting corrosion of the fuel rods in the reactor fuel assembly.

Third, the outermost cells which are defined in each spacer grid along the perimeter strips, must endure hydraulic loads caused by the cross flows of the coolant generated in the coolant channels defined between the outermost cells and neighboring fuel rods and/or generated in the spaces between the outermost cells and a variety of internal structures of the nuclear reactor. Therefore, the outermost cells of the spacer grid must be designed to endure the maximum load higher than the maximum load to be endured by the inner cells that are defined in the spacer grid by the intersecting inner strips. Furthermore, the outermost cells of the spacer grid must have a behavior capable of sufficiently enduring an excessive load unexpectedly applied thereto due to carelessness while handling the fuel rods, so that the outermost cells must be designed to have the higher structural durability.

SUMMARY OF THE INVENTION

Accordingly, the present invention has been made keeping in mind the above problems occurring in the prior art, and an object of the present invention is to provide a spacer grid for nuclear reactor fuel assemblies, which has a grid spring at a central portion of each unit strip of perimeter strips thereof so that the grid springs of the perimeter strips are in equiangular surface contact with longitudinal fuel rods in a nuclear reactor fuel assembly, different from the conventional spacer grids, thus reducing fretting corrosion of the fuel rods, and which is provided, on an upper edge of some unit strips of the perimeter strips, with both a guide vane to enhance the intensity of cross flows of the coolant passing through the spacer grid and a guide tap free from disturbing the cross flows of the coolant, thus improving the thermal redundancy of the spacer grid, due to the enhanced cross flows of the coolant.

In conventional spacer grids for nuclear reactor fuel assemblies, the grid springs and dimples of the inner and perimeter strips are in non-equiangular surface contact or linear contact with fuel rods, so that the fuel rods may slide or move relative to the grid springs and dimples at the contact surfaces thereof, thus causing the fretting corrosion of the fuel rods in the reactor core. Therefore, to prevent the fretting corrosion of the fuel rods in the reactor core, the grid springs and dimples of the inner and perimeter strips must be designed to be in equiangular surface contact with the fuel rods. However, due to a geometrical limit, it is very difficult to manufacture the shape of the grid springs, which are provided on unit corner strips of the perimeter strips defining the outermost corner cells of a spacer grid, such that the grid springs establish the equiangular surface contact with neighboring fuel rods. Therefore, in the present invention, the entire grid springs of the perimeter strips of the spacer grid are designed such that a central part of each of the grid springs, at which the grid spring is in contact with a fuel rod, has a design capable of establishing the equiangular surface contact with the fuel rod, and the remaining part of the grid spring at which the grid spring supports an external load has a simple beam shape.

Furthermore, when the guide vanes, which are provided on the upper edges of the perimeter strips to guide the flows of the coolant in an effort to improve the fuel rod cooling efficiency of the reactor fuel assembly, are arranged in the same manner in the entire outermost cells of the spacer grid, the cross flows of the coolant in the reactor fuel assembly may be disturbed by the guide vanes provided in some outermost cells. In the above state, the object of improving the thermal redundancy of the spacer grid by generating the cross flows of the coolant between neighboring fuel assemblies is beyond a design purpose, due to the guide vanes disturbing the cross flows of the coolant. Therefore, in the present invention, some unit strips of the perimeter strips which define some outermost cells required to guide the cross flows of the coolant to neighboring fuel rods are designed to have guide vanes capable of guiding the cross flows of the coolant, and the remaining unit strips of the perimeter strips which define the remaining outermost cells free from the function of guiding the cross flows of the coolant are designed to have only the guide taps without the guide vanes. Therefore, the spacer grid of the present invention reduces interference between the fuel rods and the spacer grid during an insertion or removal of the fuel rods into or from the reactor core.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
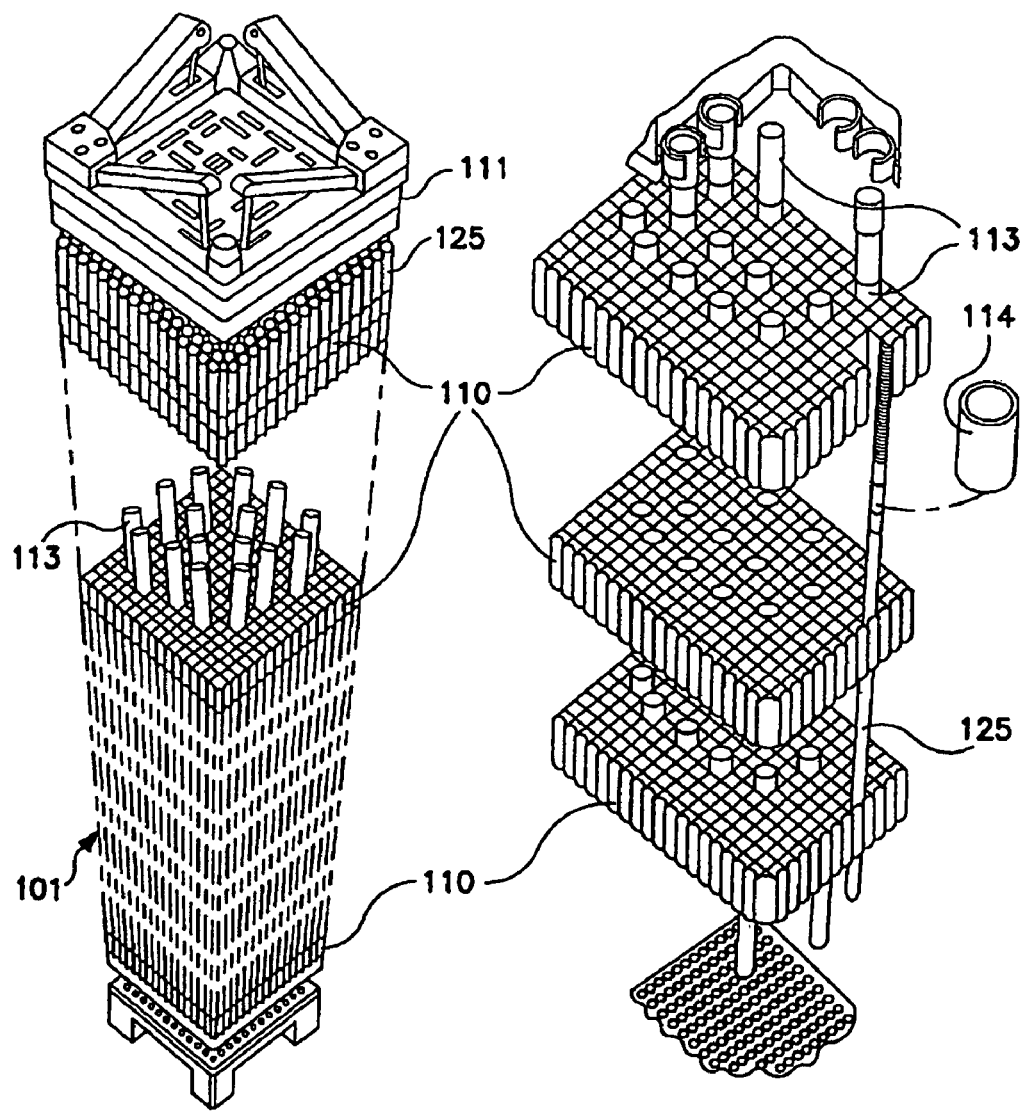
FIG. 1 is an exploded perspective view showing the construction of a typical nuclear reactor fuel assembly.
Figure 2A:
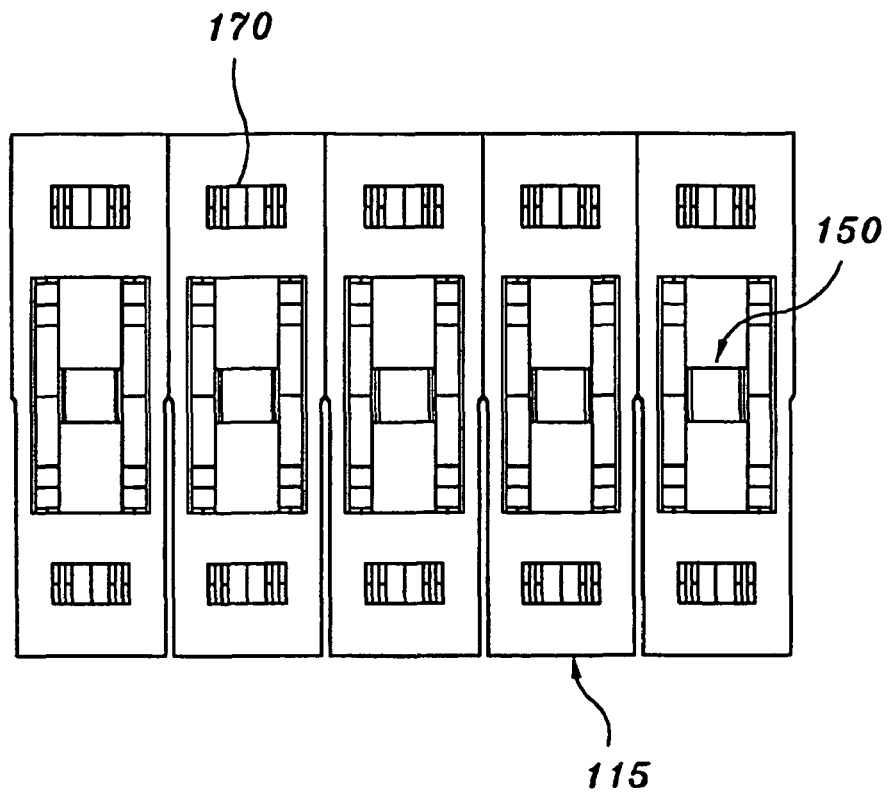
FIG. 2A is an elevation of an inner strip of a conventional spacer grid for nuclear reactor fuel assemblies, according to a first embodiment of the related art.
Figure 2B:
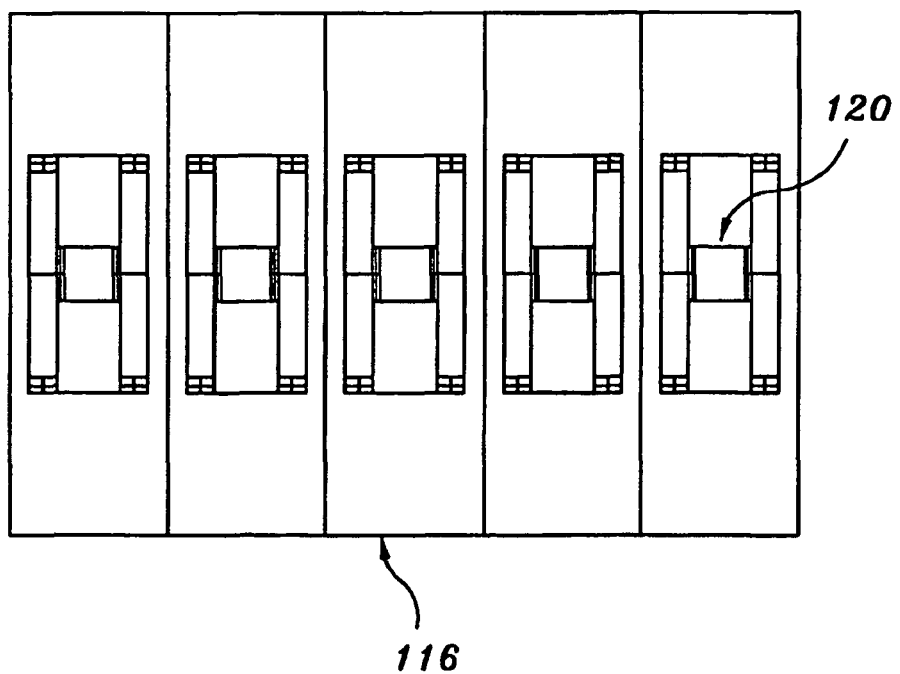
FIG. 2B is an elevation of a perimeter strip of the conventional spacer grid for nuclear reactor fuel assemblies, according to the first embodiment of the related art.
Figure 3A:
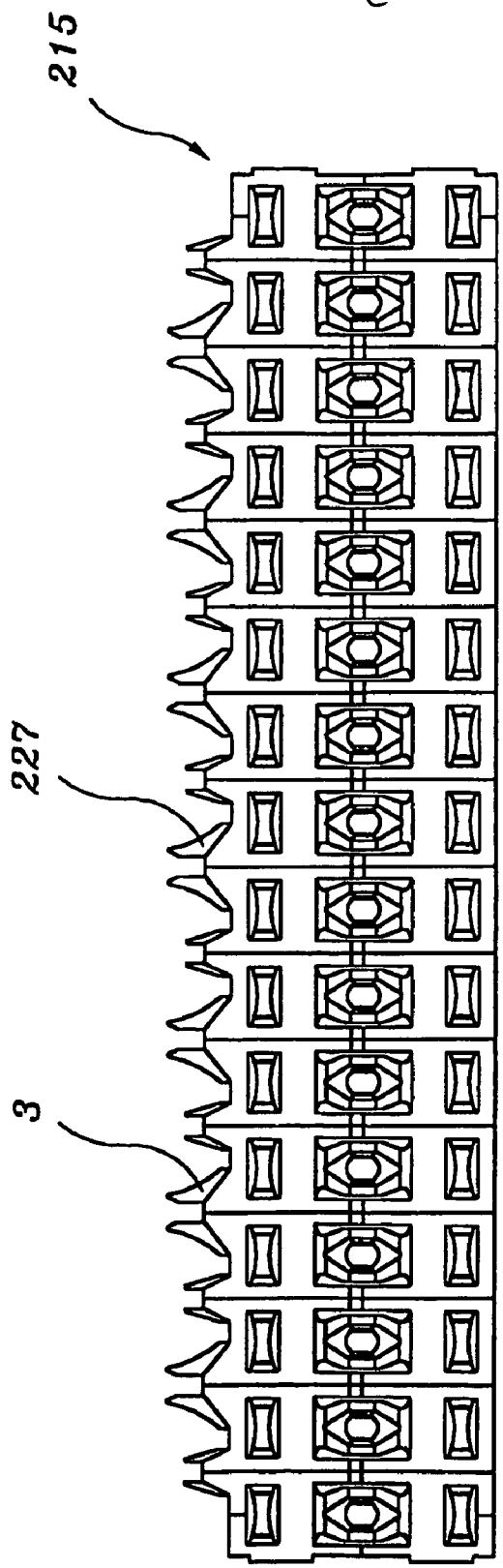
FIG. 3A is an elevation of an inner strip of a conventional spacer grid for nuclear reactor fuel assemblies, with an inner cell spring provided on each unit strip of the inner strip, according to a second embodiment of the related art.
Figure 3B:
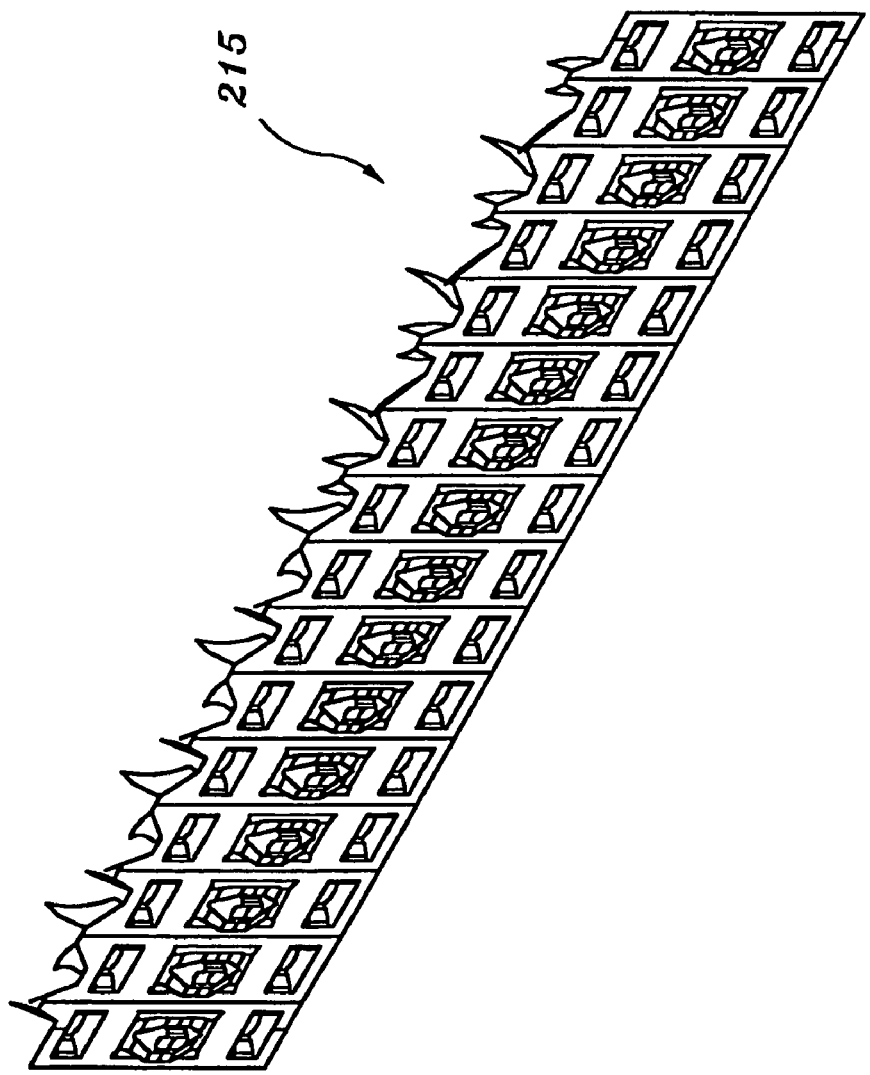
FIG. 3B is a perspective view of the inner strip of FIG. 3A.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

The spacer grid for nuclear reactor fuel assemblies according to the present invention is used in the reactor fuel assembly 101 of FIG. 1. Particularly, the spacer grid of the present invention is preferably used in a pressurized water reactor fuel assembly. As shown in FIGS. 4, 5A, 5B, 7A and 7B, the spacer grid of the present invention designated by the reference numeral 10 includes a plurality of perimeter strips (40) each of which is fabricated with a plurality of intermediate unit strips 40' and unit corner strips 40". The perimeter strips 40 encircle the intersecting inner strips 30. The unit corner strips 40" form the outermost corner cells of the spacer grid 10. Throughout this application, the intermediate unit strips 40' and the unit corner strips 40" may be referred to briefly, i.e. as the unit strip 40' and 40" respectively, for convenience. The perimeter strips 40 have a grid spring 50 on each of the intermediate unit strips 40' and the unit corner strips 40" thereof. The grid spring 50 is designed to be equiangular with a longitudinal fuel rod 125, so that the grid spring 50 is in equiangular surface contact with the fuel rod 125, and to effectively support the maximum load, and to accomplish the soundness of the reactor fuel assembly. In the perimeter strips 40, each of the intermediate unit strips 40' has both a coolant flow guide vane 57 and a guide tap 58, while each of the unit corner strips 40" has either the guide vane 57 or the guide tap 58.

Figure 5A:
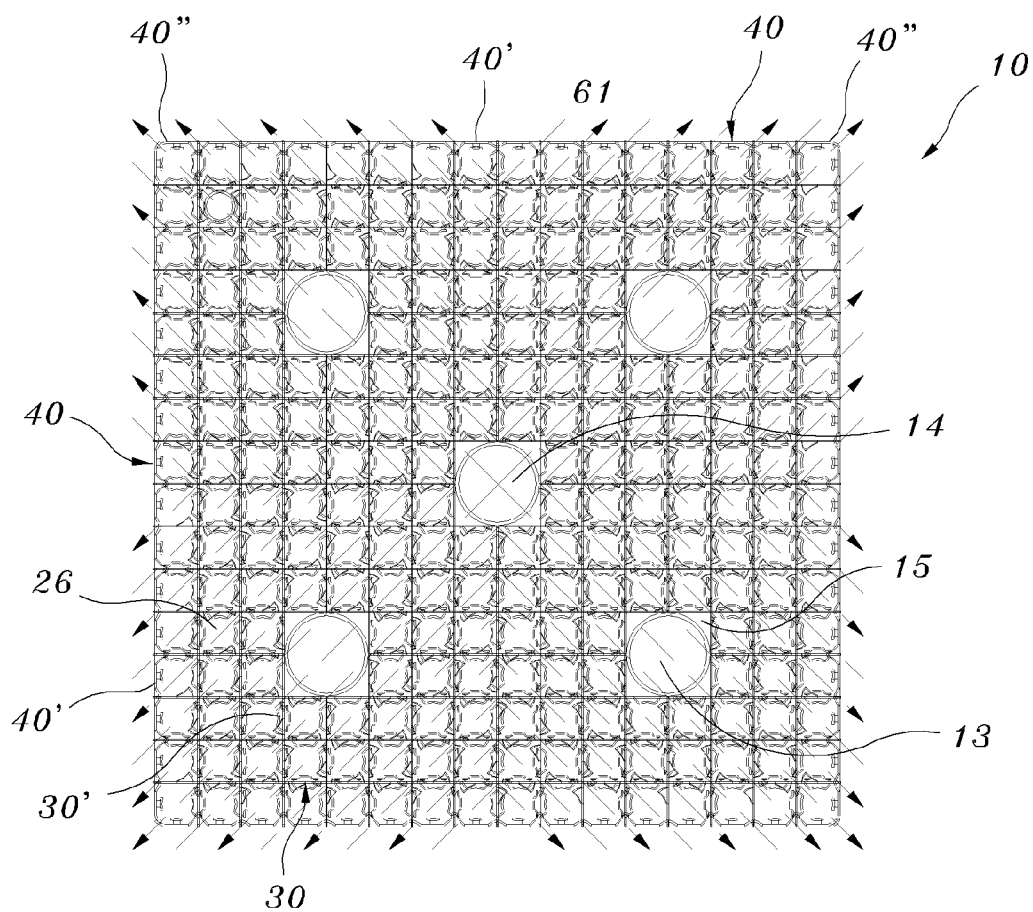
FIG. 5A is a plan view of the spacer grid of FIG. 4.
Figure 5B:
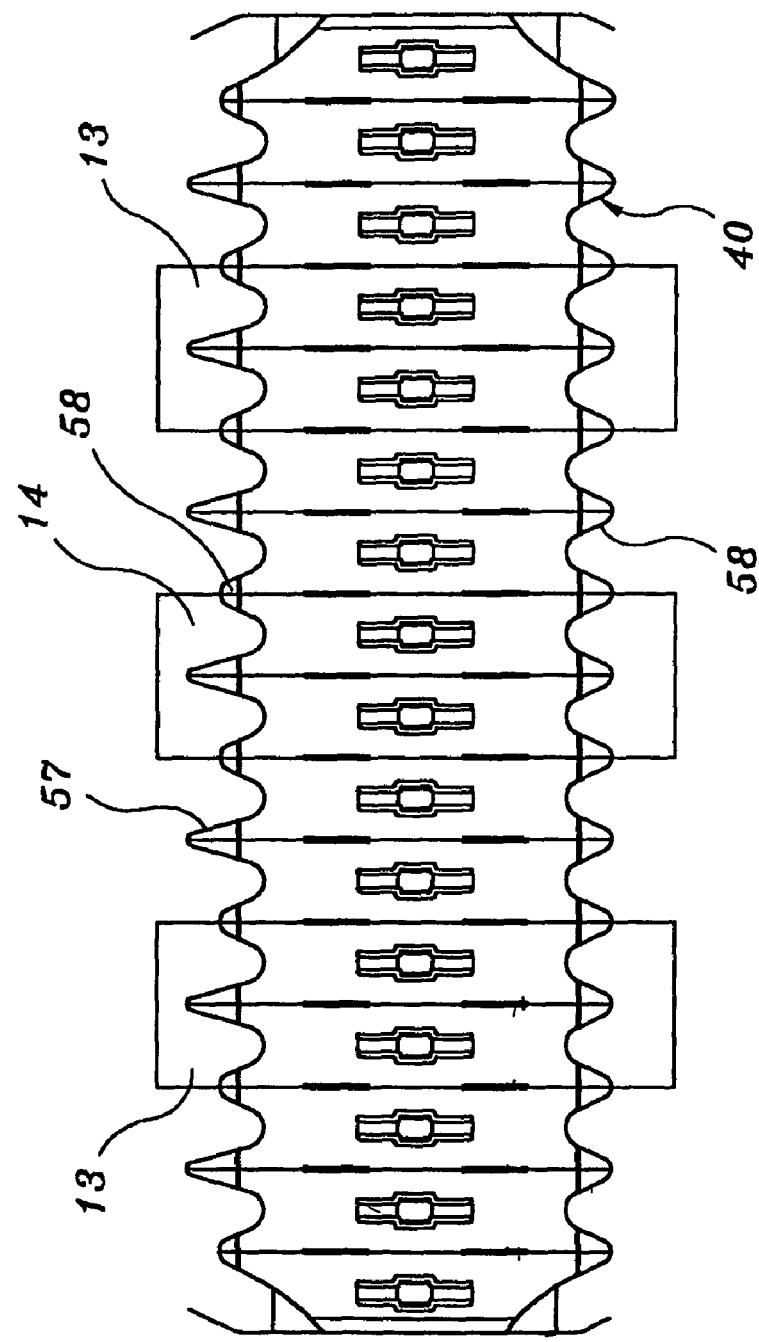
FIG. 5B is an elevation of the spacer grid of FIG. 5A to show the structure of a perimeter strip.
Figure 11:
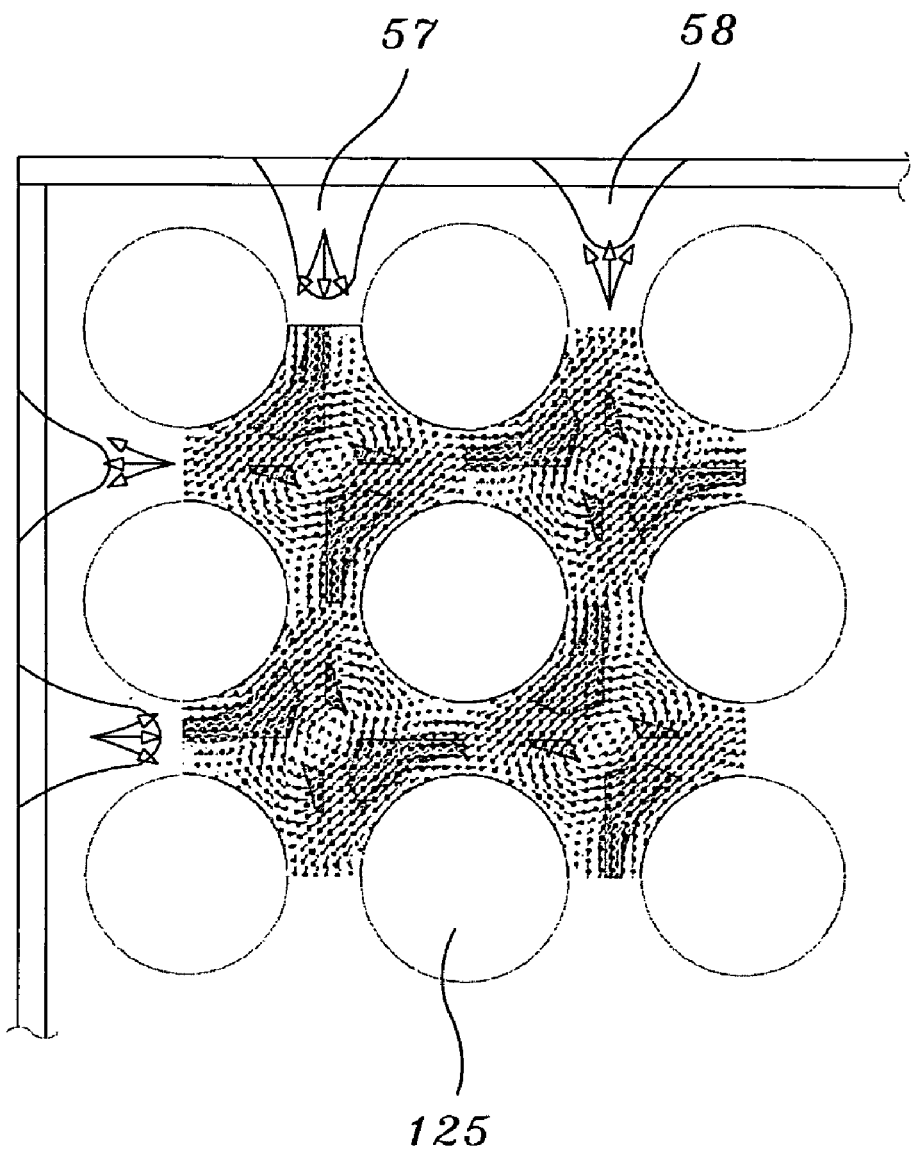
FIG. 11 is a diagram showing results of a coolant flow analysis, when the flows of the coolant in four subchannels corresponding to the positions of an equivalent diameter that is equal to two times the hydraulic diameter in the spacer grid of FIG. 4 are analyzed and expressed in the form of vectors.

The spacer grid 10 of the present invention has four guide tube cells 15 to respectively place and support four guide tubes 13 in the spacer grid 10, and a plurality of fuel rod cells 26 to place and support a plurality of fuel rods 125 in the spacer grid 10. The fuel rod cells 26 include inner and outer cells, and each support a fuel rod 125 by a plurality of grid springs 20, 50, regardless of the inner and outer cells. The inner cells further have a plurality of dimples 29 to support the fuel rods 125, in cooperation with the grid springs 20. In the spacer grid 10, the four guide tubes 13 are welded to the four guide tube cells 15, respectively, and a measuring tube 14 is supported in a measuring tube cell provided at the center of the spacer grid 10, as shown in FIGS. 5A and 5B. The expected coolant flow pattern in the spacer grid 10 is shown in FIG. 5A. During an operation of a nuclear reactor, the coolant must flow from neighboring spacer grids into the spacer grid 10 through inward paths and, at the same time, must flow from the spacer grid 10 to the neighboring spacer grids through outward paths, as shown by the arrows 61 of FIG. 5A. To accomplish the above-mentioned expected coolant flow pattern, the spacer grid 10 must be designed to generate inward and outward cross flows of the coolant between the spacer grid 10 and the neighboring spacer grids, by controlling the sizes and angles of a plurality of mixing blades of the inner cells and a plurality of mixing vanes of the outer cells such that the mixing blades and the mixing vanes smoothly guide the inward and outward cross flows of the coolant, without disturbing the cross flows of the coolant. Therefore, each of the perimeter strips of the spacer grid 10 according to the present invention has a plurality of guide vanes 57 and a plurality of guide taps 58, such that the guide vanes 57 and the guide taps 58 are alternately arranged along an upper edge of each of the perimeter strips. The above-mentioned alternate arrangement of the guide vanes 57 and the guide taps 58 is determined as follows. That is, as shown in FIG. 11 which shows the flows of the coolant relative to the spacer grid 10 analyzed and expressed in the form of vectors, the coolant flow pattern in the outside subchannels each of which is defined between four neighboring fuel rods 125 placed around the perimeter strips in the spacer grid 10 is determined such that the outward cross flows of the coolant and the inward cross flows of the coolant alternately appear in the outer cells of the spacer grid 10. Therefore, some outer cells of which the subchannels have the outward cross flows of the coolant must have the guide taps 58 which have a smaller size capable of being free from disturbing the outward cross flows of the coolant, while the remaining outer cells of which the subchannels have the inward cross flows of the coolant must have the guide vanes 57 which have a larger size than the guide taps 58, thus guiding the coolant flowing upward through the spacer grid 10 to make the coolant flow toward the center of the spacer grid 10. As shown in FIG. 5B, the guide vanes 57 are bent toward the center of the spacer grid 10, and the width of each of the guide vanes 57 reduces from a position at which the guide vane 57 is initially bent, thus the guide vane 57 has a rapidly tapered shape, with the peak of the guide vane 57 being rounded. Each of the guide taps 58 is bent toward the center of the spacer grid 10, and is rounded at the bent tip thereof to form an arc-shaped edge.

Figure 6:
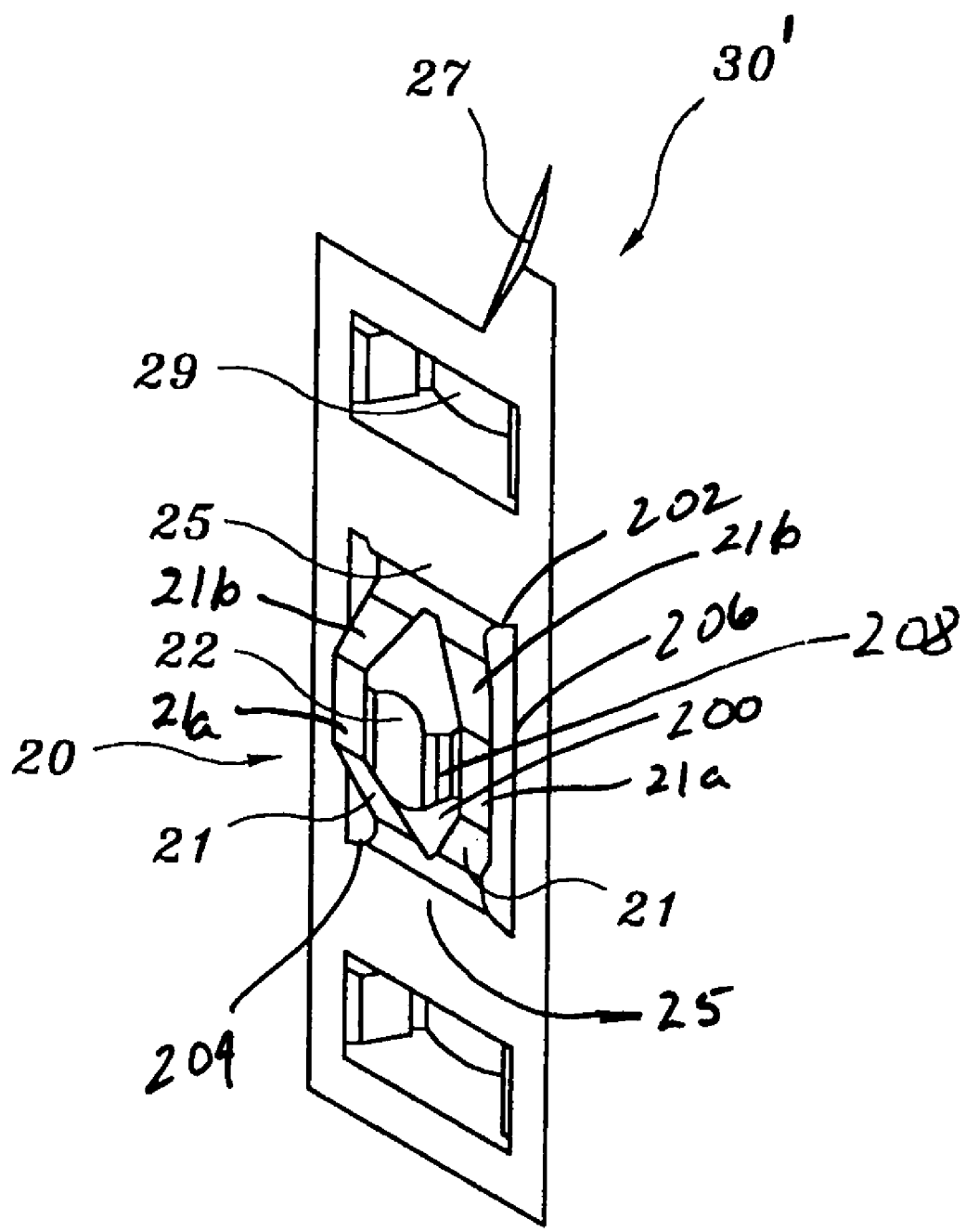
FIG. 6 is a perspective view showing an inside surface of a unit strip constituting an inner strip of the spacer grid of FIG. 4, with an inner cell grid spring provided on the unit strip to establish equiangular surface contact between a fuel rod and the unit strip in an inner cell and to enlarge an elastic range of the unit strip.

FIG. 6 is a perspective view showing an inside surface of a unit strip 30' of inner strip 30 constituting the inner cells of the spacer grid 10, with the inner cell grid spring 20 provided on the unit strip 30' to establish equiangular surface contact between a fuel rod 125 and the unit strip 30' in the inner cell of the spacer grid 10. As shown in FIG. 6, the inner cell grid spring 20 of each unit strip 30' of the inner strip includes a vertical support part 21 that comprises two bridges extending from spring base parts 25 provided on the land surface of the unit strip. The two bridges of the vertical support part 21 are bent toward a fuel rod 125, and may be diverged or converged in a direction toward the central portion of the grid spring 20. The vertical support part 21 is only bent when the grid spring 20 is loaded, thus the vertical support part 21 allows the fuel rods 125 to have a desired elastic behavior. A fuel rod support part 22 is provided at the central portion of the vertical support part 21. The fuel rod support part 22 has a conformal support surface which is specifically bent to have the same radius of curvature as that of the fuel rod 125, thus being brought into equiangular or conformal surface contact with the external surface of the fuel rod 125. That is, the conformal support surface of the fuel rod support part 22 is designed to have an optimal circular or elliptical profile, so that the conformal support surface is suitable for enlarging the surface contact area of the fuel rod support part 22 relative to the fuel rod 125, in addition to accomplishing a desired uniform contact pressure distribution and reducing the peak stress of the fuel rod support part 22. When the inner cell grid spring 20 having the above-mentioned double bridge-type simple beam structure is loaded by the fuel rod 125 to be deformed, the spring base parts 25 are initially deformed, before the fuel rod support part 22 is deformed. Therefore, the inner cell grid spring 20 minimizes the deformation of the fuel rod support part 22. In FIG. 6, the reference numeral 27 and 29 denote a mixing blade and a dimple of the unit strip 30', respectively. FIG. 6 shows inner grid springs 20 on the inner strips 30', wherein the inner grid springs comprise an opening 200 formed in the inner strips and defined by top, bottom and side edges, 202, 204 and 206 respectively, two spaced inner support parts (collectively shown at 21, 21a and 21b) extending vertically in the opening 200 between the top and bottom edges 202, 204 of the opening, and an inner fuel rod support part 22 extending transversely between the two spaced inner support parts (portions 21a in FIG. 6), the inner fuel rod support part 22 being bent at least two steps along vertical bending lines 208 and defining an equiangular support surface which is equiangular with a fuel rod supported by the inner grid spring. The vertical support part 51 (See FIG. 7A) and the two spaced inner support parts 21, 1a, 21b are different in structure.

Figure 4:
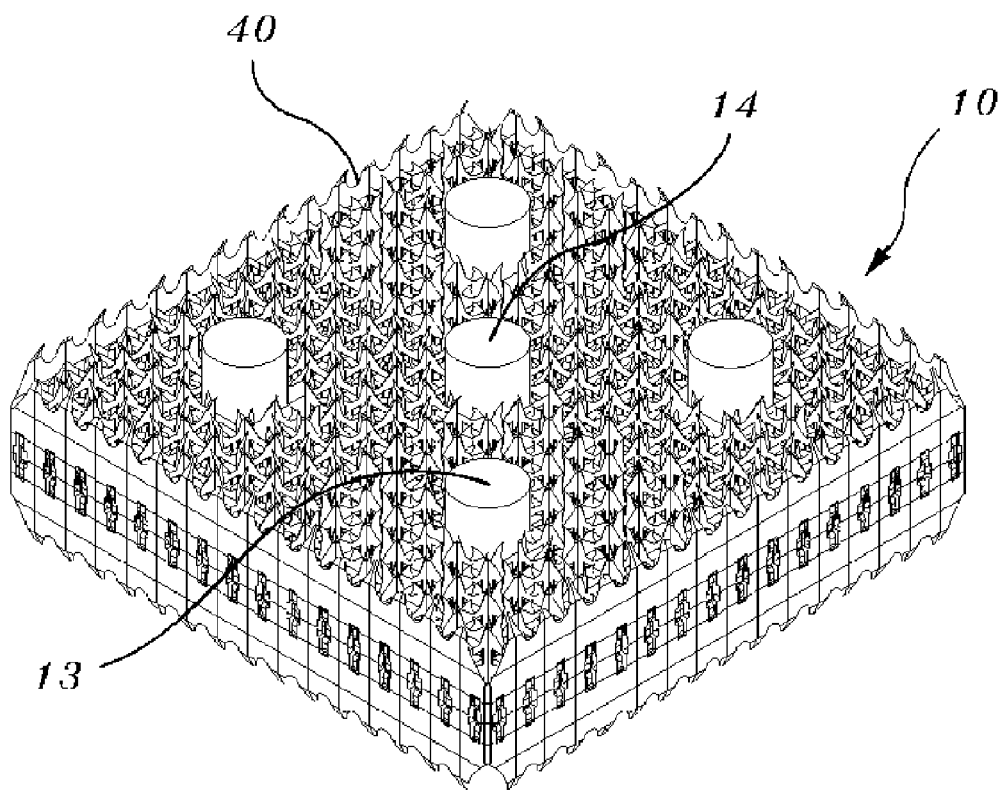
FIG. 4 is a perspective view showing the construction of a spacer grid for nuclear reactor fuel assemblies, which has four perimeter strips according to an embodiment of the present invention.
Figure 7A:
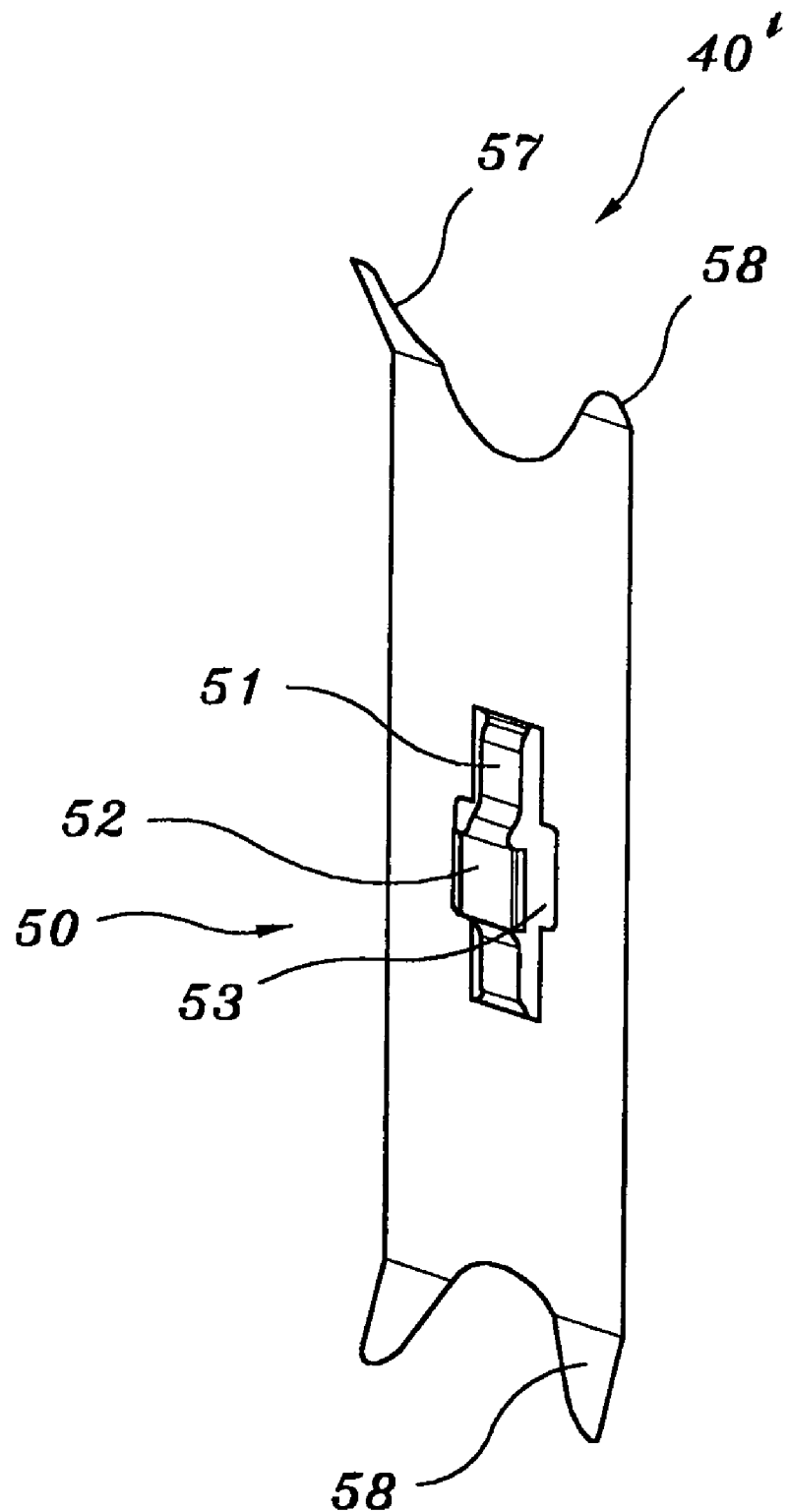
FIG. 7A is a perspective view showing an inside surface of a intermediate unit strip constituting the perimeter strips of the spacer grid of FIG. 4, with an outer cell grid spring, a guide vane and a guide tap provided on the intermediate unit strip.
Figure 7B:
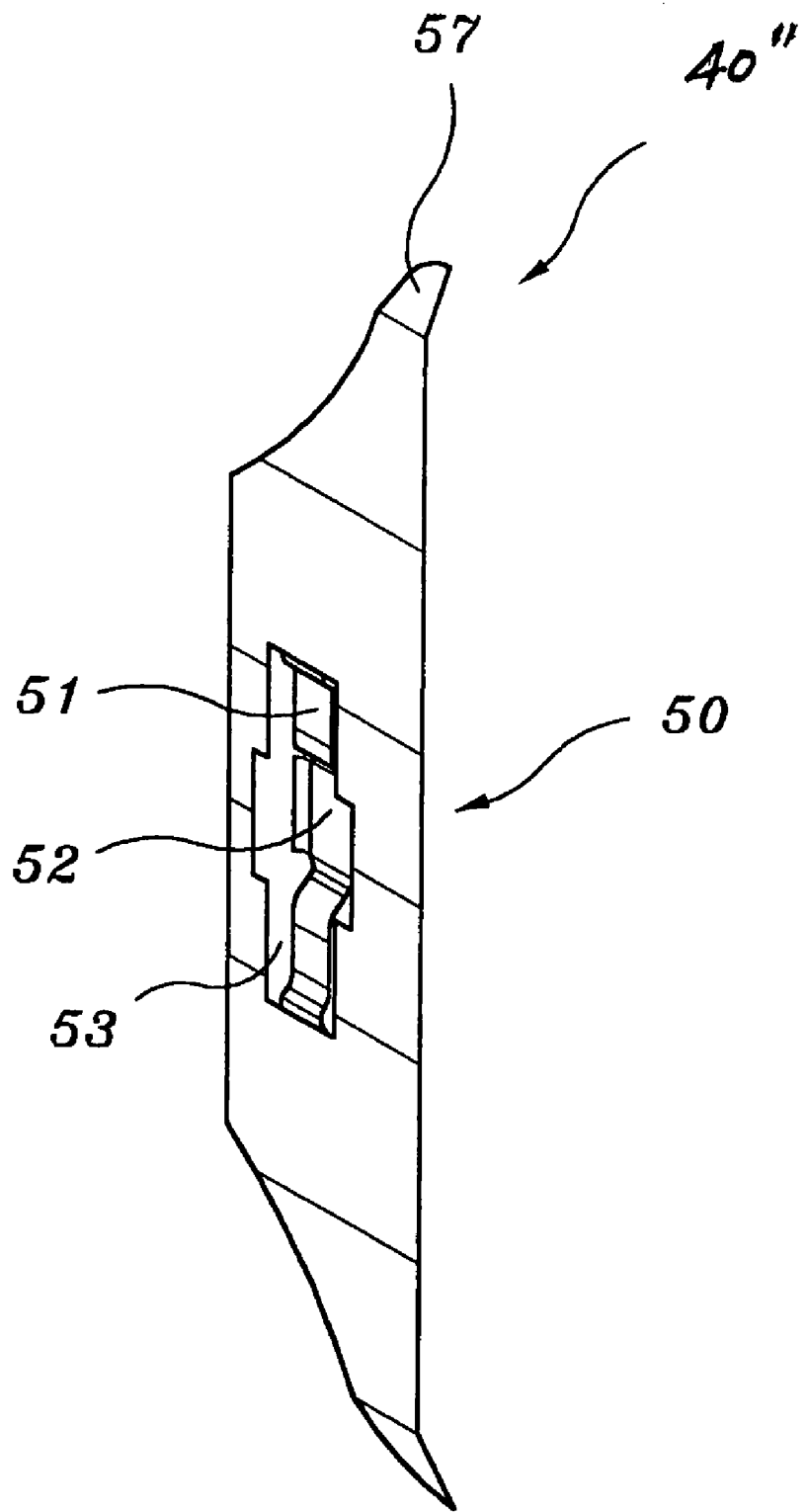
FIG. 7B is a perspective view showing an outside surface of a unit corner strip constituting the perimeter strips of the spacer grid of FIG. 4, with an outer cell grid spring and a guide tap provided on the unit corner strip.

FIG. 7A is a perspective view showing an inside surface of the intermediate unit strip 40' constituting the perimeter strips 40 of the spacer grid 10 of FIG. 4, and FIG. 7B is a perspective view showing an outside surface of the unit corner strip 40" constituting the perimeter strips 40 of the spacer grid 10. As shown in FIGS. 7A and 7B, the above-mentioned design of the inner cell grid springs 20 is adapted to the perimeter strips of the present invention. That is, the double bridge-type simple beam structure of the inner cell grid springs 20 is remodeled into a single bridge-type structure, thus producing the outer cell grid spring 50 which is used in the perimeter strips of the spacer grid 10 of FIG. 4. Due to the single bridge-type outer cell grid spring 50, the spacer grid 10 efficiently supports the fuel rods 125 in the outermost cells thereof including the outermost corner cells which have a narrow width, with the grid springs 50 of the outermost corner cells being in equiangular surface contact with the fuel rods 125. To form the single bridge-type outer cell grid spring 50 on each of the unit strips 40' and 40" of the perimeter strips 40 according to the present invention, a vertical opening 53 is formed at the central area of each unit strip 40', 40" of the perimeter strips 40, with a vertical support part 51 comprising a single bridge extending vertically between the central portions of the top and bottom edges of the vertical opening 53. The vertical support part 51 is bent at two steps. A fuel rod support part 52 is provided at the central portion of the vertical support part 51. The fuel rod support part 52 has a conformal support surface which is specifically bent to have an outward rounded cross-section with the same radius of curvature as that of the fuel rod 125, thus being brought into equiangular surface contact with the external surface of the fuel rod 125. Such a conformal support surface of the fuel rod support part 52 is suitable for accomplishing a desired uniform contact pressure distribution of the fuel rod support part 52. In the present invention, the equiangular surface contact of the outer cell grid spring 50 with the fuel rod 125 means that the contact surfaces of the grid spring 50 and the fuel rod 125 are rounded in the same direction so that the centers of curvature of the contact surfaces of the grid spring 50 and the fuel rod 125 are placed at the same side of the contact surfaces. However, when two contact surfaces are in contact with each other, with the centers of curvature of the two contact surfaces being placed at opposite sides of the contact surfaces, the contact is so-called a "non-equiangular contact".

Furthermore, because the outer cells of the spacer grid 10 must endure the cross flows of the coolant which are originated from neighboring coolant channels and/or the internal structures of the nuclear reactor, the outer cell grid springs 50 provided on the perimeter strips must be designed such that the outer cell grid springs 50 efficiently support the maximum load which is higher than the maximum load imposed on the inner cell grid springs 20, and have the spring strength higher than the spring strength of the inner cell grid springs 20. Therefore, the strength of the vertical support part 51 must be optimally determined to allow the outer cell grid springs 50 to efficiently endure the higher maximum load applied thereto, and the spring strength of the outer cell grid springs 50 must be optimally determined to allow the outer cell grid springs 50 to efficiently support the fuel rods 125 even when an excessive load is applied to the fuel rods 125 due to intensive cross flows of the coolant in the reactor fuel assembly. In a brief description, the fuel rod support parts 52 of the outer cell grid springs 50 provided on the perimeter strips of the spacer grid 10 are designed to be in equiangular surface contact with the fuel rods 125, in the same manner as the inner cell grid springs 20 of the inner strips.

Figure 8:
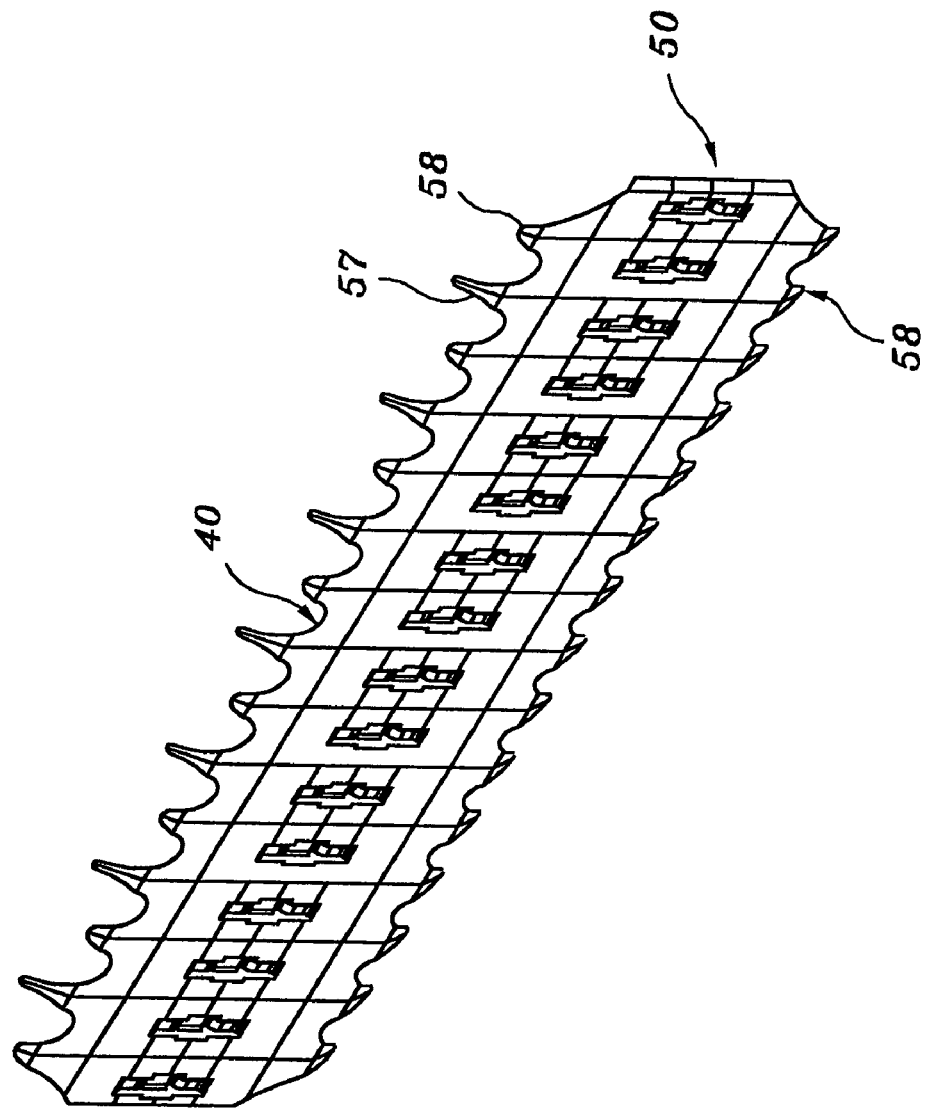
FIG. 8 is a perspective view of each of the perimeter strips of the spacer grid of FIG. 4, with the outer cell grid springs provided on the unit strips of the perimeter strip.

As best seen in FIG. 8, each of the plurality of perimeter strips, comprising the intermediate unit strips 40' and the unit corner strips 40", includes the outer cell grid springs 50 which are in equiangular surface contact with the fuel rods 125. Each of the perimeter strips further has the guide vane 57 and the guide taps 58 which are alternately arranged along the upper edge of the perimeter strip. The guide vanes 57 guide the flows of the coolant in the reactor fuel assembly, and the guide taps 58 reduce interference between the fuel rods 125 and the spacer grid 10 during an insertion or removal of the fuel rods 125 into or from the reactor core. The guide vanes 57 of the perimeter strips are the guide blades to guide the flows of the coolant to neighboring coolant channels, without disturbing the cross flows of the coolant which are originated from the mixing blades 27 of the inner strips. To allow the fuel rods 125 to be inserted into or removed from the reactor core without interference between the spacer grid 10 and the fuel rods 125, the guide vanes 57 and the guide taps 58 are alternately arranged along the upper edge of the perimeter strip. The guide taps 58 are also arranged along the lower edge of the perimeter strip at positions corresponding to the positions of the guide vanes 57 and the guide taps 58 of the upper edge, thus the guide taps 58 of the lower edge efficiently guide the fuel rods 125 while eliminating the interference between the spacer grid 10 and the fuel rods 125, during the insertion or removal of the fuel rods 125 into or from the reactor core.

Figure 9:
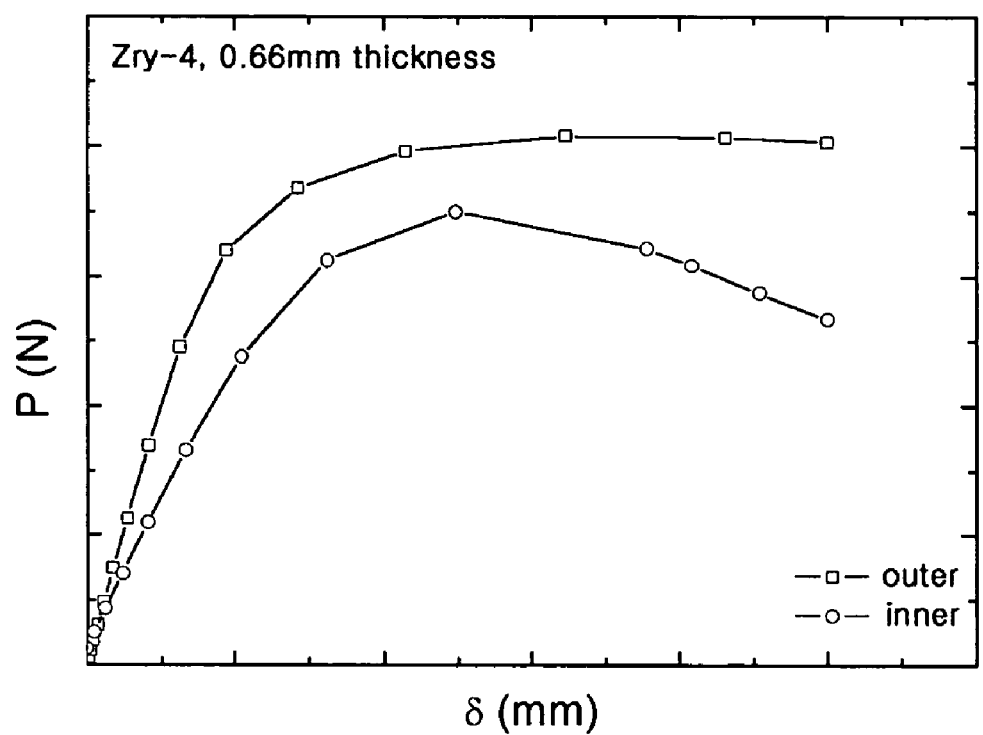
FIG. 9 is an FEM diagram, comparatively showing the characteristic curves of strain relative to a load applied to the inner and outer cell grid springs of the spacer grid of FIG. 4, analyzed through a finite element method (FEM)

FIG. 9 is an FEM diagram, comparatively showing the characteristic curves of strain relative to a load applied to the inner and outer cell grid springs 20 and 50 of the spacer grid 10, analyzed through a finite element method (FEM). As shown in the FEM diagram of FIG. 9, the outer cell grid springs 50 can endure the maximum load which is higher than that of the inner cell grid springs 20, and have spring strength higher than that of the inner cell grid springs 20.

In a detailed description of the FEM diagram, the outer cell grid springs 50 can endure the maximum load which is higher than that of the inner cell grid springs 20. In addition, the maximum load which can be endured by the outer cell grid springs 50 is maintained without being reduced even though the strain of the outer cell grid springs 50 is continuously increased after the peak of the maximum load. However, the maximum load which can be endured by the inner cell grid springs 20 is reduced when the strain of the outer cell grid springs 50 is increased after the peak of the maximum load. The above-mentioned characteristics of the outer cell grid springs 50 are suitable for accomplishing the soundness of the reactor fuel assembly.

Figure 10:
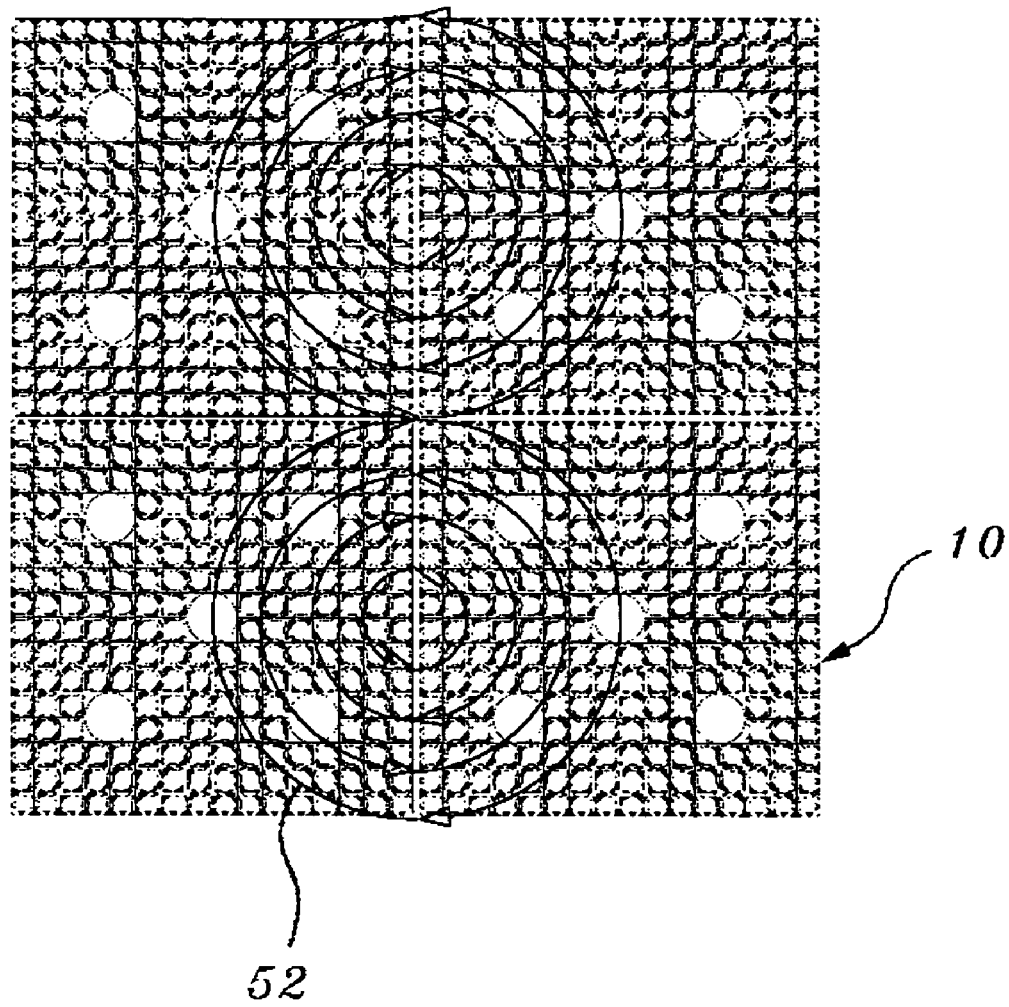
FIG. 10 is a diagram showing virtual flows of the coolant in the channels defined between four neighboring spacer grids of the present invention to generate cross flows of the coolant between the spacer grids.

FIG. 10 is a diagram showing the virtual flows 52 of coolant in the channels defined between four neighboring spacer grids 10 of the present invention to generate the cross flows of the coolant between the spacer grids 10. As shown in FIG. 10, the mixing blades 27 which are provided in each spacer grid 10 to mix the coolant, are designed to generate the cross flows of the coolant in every 1/4 sectors of each spacer grid 10, based on the center of the spacer grid 10. To secure the desired cross flows of the coolant between the neighboring spacer grids 10, the perimeter strips of each spacer grid 10 must be free from disturbing the cross flows of the coolant. Therefore, the guide vanes 57 and the guide taps 58 are alternately arranged along the upper edge of each of the perimeter strips of the spacer grids 10, thus the desired intensity of the cross flows of the coolant in the channels between the four spacer grids 10 is maintained without being reduced.

FIG. 11 is a diagram showing results of a coolant flow analysis, when the flows of the coolant in four subchannels corresponding to the positions of an equivalent diameter that is equal to two times the hydraulic diameter in the spacer grid of FIG. 4 are analyzed and expressed in the form of vectors. The above-mentioned coolant flow analysis is performed in an effort to enhance the thermal hydraulic performance of the spacer grid 10. In the reactor fuel assembly, the flows of the coolant mixed by the mixing blades are typically characterized in that the magnitude of the flows of mixed coolant is gradually reduced as the coolant flows. Therefore, some mixing blades of the spacer grid are problematic in that, even though the mixing blades have a high coolant mixing performance at the downstream of the spacer grid which is a position just above the spacer grid, the magnitude of the flows of the coolant mixed by the mixing blades may quickly decay, thus the object of enhancing the fuel rod cooling efficiency of the reactor fuel assembly by providing the mixing blades on the spacer grid may be beyond attainment. Therefore, it is necessary to maintain the magnitude of the flows of the coolant mixed by the mixing blades for a lengthy period. To clearly show the maintenance of the magnitude of the flows of the coolant mixed by the mixing blades, the coolant flow components at the positions of an equivalent diameter that is equal to two times, five times, or ten times the hydraulic diameter in the spacer grid are analyzed, and numerically expressed or expressed in the form of vectors.

As shown in FIG. 11, because the guide taps 58 are provided on the perimeter strips of the spacer grid 10 according to the present invention at positions corresponding to the cells at which the cross flows of the coolant flow outward from the spacer grid 10 to the neighboring spacer grids, the perimeter strips do not disturb the outward cross flows of the coolant. In addition, the guide vanes 57 are provided on the perimeter strips of the spacer grid 10 at positions corresponding to the cells at which the cross flows of the coolant flow inward to the spacer grid 10, the perimeter strips of the spacer grid 10 guide the inward cross flows of the coolant. That is, the guide vanes 57 and the guide taps 58 are alternately arranged along the upper edge of each of the perimeter strips of the spacer grid 10, so that the spacer grid 10 enhances the intensity of the cross flows of the coolant.

As described above, in the conventional spacer grids for nuclear reactor fuel assemblies, the grid springs of the inner and outer cells are in non-equiangular surface contact or linear contact with the fuel rods, thus causing damage to the fuel rods due to fretting corrosion, when the grid springs are deformed by loads applied from the fuel rods thereto. In an effort to overcome the fretting corrosion of the fuel rods, double bridge-type grid springs designed to be in equiangular surface contact with the fuel rods have been proposed. However, the double bridge-type grid springs capable of being in equiangular surface contact with the fuel rods are adapted to only the inner strips which intersect each other to define the inner cells, but are not adapted to perimeter strips which define the outermost cells of the spacer grid, due to geometric limit of the double bridge-type structure of the grid springs.

However, in the present invention, the double bridge-type grid springs used in the inner cells of the conventional spacer grids are remodeled into single bridge-type grid springs which can be in equiangular surface contact with the fuel rods in inner and outer cells of the spacer grid. Particularly, the single bridge-type grid springs are effectively used in the outermost corner cells of the spacer grid even though the outermost corner cells have a narrow width to cause the geometric limit. The single bridge-type grid springs of the present invention maintain the equiangular surface contact shape thereof for a lengthy period, thus stably supporting the fuel rods in the reactor fuel assembly while preventing the fuel rods from sliding relative to the grid springs, and thereby preventing the fretting corrosion of the fuel rods.

Furthermore, a plurality of guide vanes to guide the flows of the coolant and a plurality of guide taps are alternately arranged along the upper edge of each of the perimeter strips of the spacer grid according to the present invention. Thus, the perimeter strips of the spacer grid does not disturb the cross flows of the coolant which are generated by mixing blades and flow between neighboring spacer grids. Due to the alternate arrangement of the guide vanes and the guide taps on the upper edge of the perimeter strip, the cross flows of the coolant which are generated by the mixing blades maintain the intensity thereof after the cross flows of the coolant reach the neighboring spacer grids, thus the thermal redundancy of the spacer grid is enhanced. In other words, when the intensity of the cross flows of the coolant is enhanced by the spacer grids, it is possible to accomplish uniform distribution of the coolant temperature in the coolant channels around the entire fuel rods of the reactor fuel assembly, without causing a gradient in the coolant temperature, thus the coolant is prevented from being overheated in some coolant channels and thereby prevents parts of the fuel rods from being overheated. The spacer grid of the present invention thus almost completely prevents a DNB (Departure caused by Nucleate Boiling), increases the output power of nuclear fuel.

The present invention may be preferably used for supporting a plurality of tubes or pipes situated lengthwise in an industrial machine using fluid feeding pipelines, boilers or heat exchangers while reducing occurrence of fracture of the tubes or pipes caused by abrasion, fatigue or vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid (10) for placing and supporting a plurality of longitudinal fuel rods (125) in a nuclear reactor fuel assembly, comprising:

a plurality of inner strips (30) intersecting each other to form a plurality of guide tube cells (15) to receive guide tubes (13) therein and a plurality of fuel rod cells (26) to receive the fuel rods (125) therein, with a plurality of mixing blades (27) projecting upward from the inner strips (30) at intersections of the inner strips (30); and a plurality of perimeter strips (40) each of which comprises a plurality of unit strips including intermediate unit strips (40') and corner unit strips (40"), the perimeter strips (40) encircling the intersecting inner strips (30), and the corner unit strips (40") forming outermost corner cells of the spacer grid (10), with a grid spring (50) provided on each of the unit strips (40', 40"), the grid spring (50) comprising:

a vertical opening (53) formed at a central area of each of the unit strips;

a vertical support part (51) extending vertically in the vertical opening (53) from central portions of top and bottom edges of the vertical opening (53); and a fuel rod support part (52) provided at a central portion of the vertical support part (51), the fuel rod support part (52) being bent to have equiangular surface contact with a fuel rod supported by the grid spring for reducing fretting corrosion of the fuel rod, further comprising inner grid springs on the inner strips, wherein the inner grid springs comprise an opening formed in the inner strips and defined by top, bottom and side edges, two spaced inner support parts extending vertically in the opening between the top and bottom edges of the opening, and an inner fuel rod support part extending transversely between the two spaced inner support parts, the inner fuel rod support part being bent at least two steps along vertical bending lines and defining an equiangular support surface which is equiangular with a fuel rod supported by the inner grid spring, wherein the vertical support part and the two spaced inner support parts are different in structure, wherein each of the intermediate unit strips (40') has a coolant flow guide vane (57) and a guide tap (58) on an upper edge thereof such that a plurality of coolant flow guide vanes (57) and a plurality of guide taps (58) are alternately arranged along an upper edge of each of the intermediate unit strips (40'), and each of the unit corner strips (40") having either a coolant flow guide vane (57) or a guide tap (58) on an upper edge thereof to complete an alternate arrangement of the coolant flow guide vanes (57) and the guide taps (58), in cooperation with the intermediate unit strips (40'), wherein each of the plurality of intermediate unit strips (40') has two guide taps (58) projecting downward at both corners on a lower edge of each of the intermediate unit strips (40'), and each of the plurality of unit corner strips (40") has a guide tap (58) projecting downward on a lower edge of each of the unit corner strips (40") for reducing interference between the fuel rods (125) and the spacer grid (10) when the fuel rods (125) are inserted and removed.

2. The spacer grid (10) according to claim 1, wherein the vertical support part (51) is bent at two steps along substantially horizontal bending lines, and the fuel rod support part (52) is equiangular with the fuel rods (125), whereby a uniform contact pressure distribution is provided between the fuel rod support part (52) in contact with the fuel rods (125).

3. The spacer grid (10) according to claim 1, wherein each of the coolant flow guide vanes (57) is bent toward a center of the spacer grid (10), with a width of each of the guide vanes (57) reducing from a position at which each of the guide vanes (57) is initially bent, each of the guide vanes (57) has a tapered shape, with a peak of each of the guide vanes (57) being rounded.

4. The spacer grid (10) according to claim 1, wherein each of the guide taps (58) is bent toward the center of the spacer grid (10), and is rounded at a bent tip thereof to form an arc-shaped edge.

5. The spacer grid according to claim 1, wherein the vertical support part and the two spaced inner support parts have a different geometry.

6. The spacer grid according to claim 1, wherein the vertical support part and the two spaced inner support parts have a different shape.

7. The spacer grid according to claim 1, wherein the two spaced inner support parts are spaced from each other and from the side edges.

* * * * *

UNITED STATES PATENT AND TRADEMARK OFFICE
CERTIFICATE OF CORRECTION

PATENT NO. : 7,769,125 B2
APPLICATION NO. : 10/773733
DATED : August 3, 2010
INVENTOR(S) : Kyung-Ho Yoon et al.

It is certified that error appears in the above-identified patent and that said Letters Patent is hereby corrected as shown below:

On the Title page, Item (73) assignee should be listed as follows:

Korea Atomic Energy Research Institute, Daejeon (KR)
Korea Hydro & Nuclear Power Co., Ltd., Seoul (KR)

Signed and Sealed this

Twenty-first Day of September, 2010

David J. Kappos
*Director of the United States Patent and Trademark Office*